FIG. I

INVENTOR.
WILLIS D. KERVIN

INVENTOR.
WILLIS D. KERVIN
ATTORNEYS

Dec. 17, 1968    W. D. KERVIN    3,416,570
GAS MIXING VALVE

Filed Jan. 11, 1966    3 Sheets-Sheet 3

INVENTOR.
WILLIS D. KERVIN
BY
Dike, Thompson, Bronstein & Mrose
ATTORNEYS

United States Patent Office 3,416,570
Patented Dec. 17, 1968

3,416,570
GAS MIXING VALVE
Willis D. Kervin, 1306 Sunset Drive,
Johnson City, Tenn. 37601
Filed Jan. 11, 1966, Ser. No. 519,870
12 Claims. (Cl. 137—625.17)

ABSTRACT OF THE DISCLOSURE

A mixing valve having a valve body which comprises a length of pipe with circumferentially spaced slots therein constituting inlet ports, each slot having an end of a pipe section secured thereover for inletting a different gas into and through each slot, and a hollow tubular valve member slidably and rotatably adjustable in the length of pipe and having a pair of slots therein arranged so that rotational adjustment thereof in one direction changes the effective flow area of one of such inlet ports without affecting substantially the effective flow area of the other inlet port, so that rotational adjustment thereof in an opposite direction changes the effective flow area of the other inlet port without affecting substantially the effective flow area of the one inlet port, and so that longitudinal adjustment thereof changes total flow through both inlet ports. The effective flow areas and total flow are changed as aforesaid by changing the degree of rotational and axial registry of the slots in the valve member with the inlet ports. Rotational adjustments of the valve member are achieved by a worm gear arrangement.

---

The present invention relates to a novel gas mixing valve construction for simultaneously controlling the ratio and flow of any two or more mixed gases and/or vapors with precise accuracy.

The advantages of the valve of the present invention are simplicity of construction and operation; ruggedness; minimum of maintenance and attention required; minimum of effect on flow and proportion of the mixing gases by changes in outside conditions; automatic control of both total flow through the valve and proportioning of the gases; positive closure and tight shutoff in the event of malfunctioning controls or safety shutdown by the safety system.

Other advantages will be apparent from the following description and accompanying drawings of a preferred embodiment of the invention, in which drawings.

Figure 1:
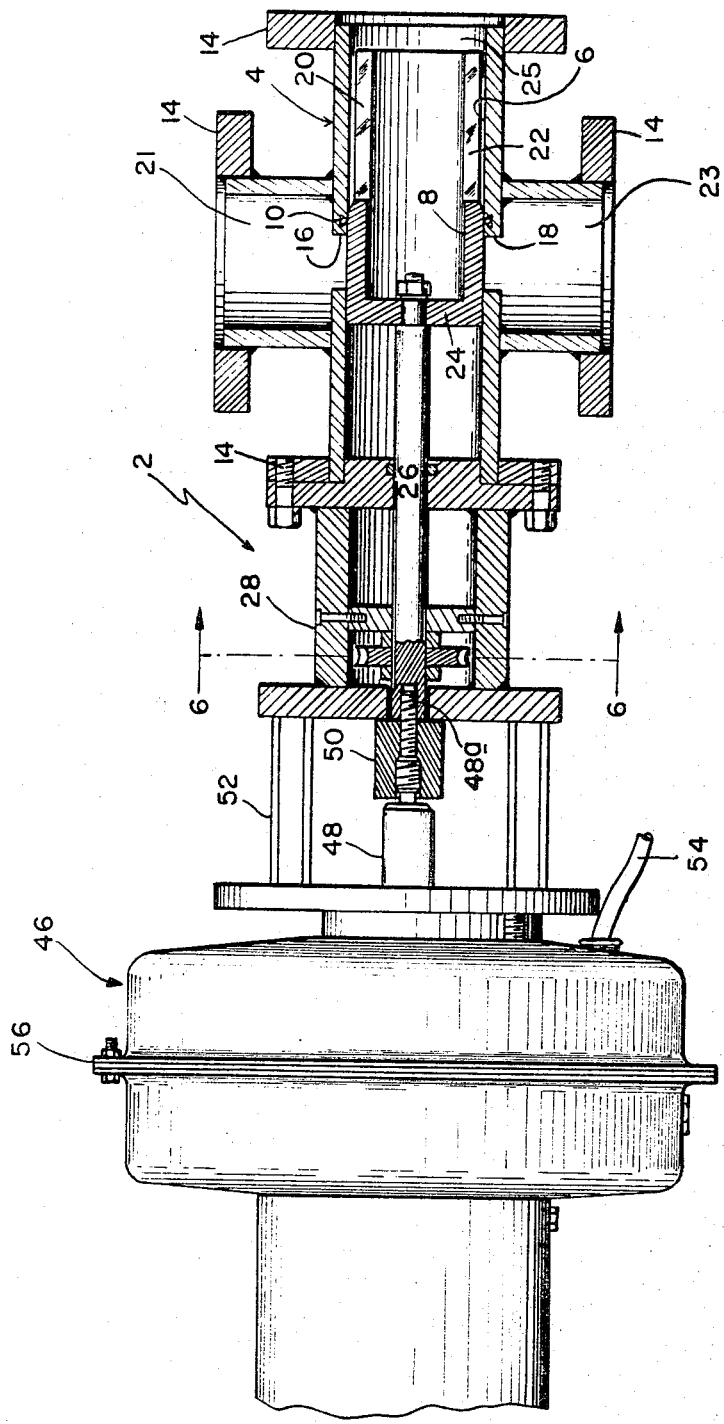
FIGURE 1 is a view in elevation and partially in section of a mixing valve embodying the present invention and in which the valve is closed so that there is no flow therethrough.

With reference to the drawings, the valve 2 consists of the body 4 made of cylindrical seamless steel tubing or other suitable alloy to meet the requirements of the governing bodies for use with flammable gases. The inside surface 6 is bored smooth to allow rotational and longitudinal movement therein of the piston valve 8. The bore 6 has a circumferential slot 10 accommodating a neoprene O-ring 12. Body 4 has standard pipe flanges 14 to connect to a standard piping system. Bore 6 has two rectangular shaped slots 16 and 18 therein, which, in conjunction with the two rectangular slots 20 and 22 in the open end of the piston valve 8, form variable orifices between inlet chambers 21 and 23, respectively, and outlet chamber 25 of body 4. The relative sizes of such orifices can be adjusted by adjusting the rotational position of the piston valve 8, as described more fully hereinafter. The sizes of such orifices can also be adjusted by adjusting the longitudinal position of the piston valve in the bore as will be described more fully. The latter adjustment varies the total flow through the valve whereas the circumferential adjustment referred to above varies the relative sizes of the orifices and hence the relative flow of gases therethrough.

The piston valve 8 is made from hard material, usually brass, for both strength and a smooth finish to reduce friction against the wall of bore 6 and the O-ring 12. The piston valve 8 is cylindrical and the two slots 20 and 22 are machined in the walls thereof to permit controlled admission of the gases from the slots or inlet ports 16 and 18. The closed end 24 of the piston valve 8 is securely connected to a shaft 26 through which is transmitted longitudinal and rotary movement of the piston valve in bore 6.

Figure 6:
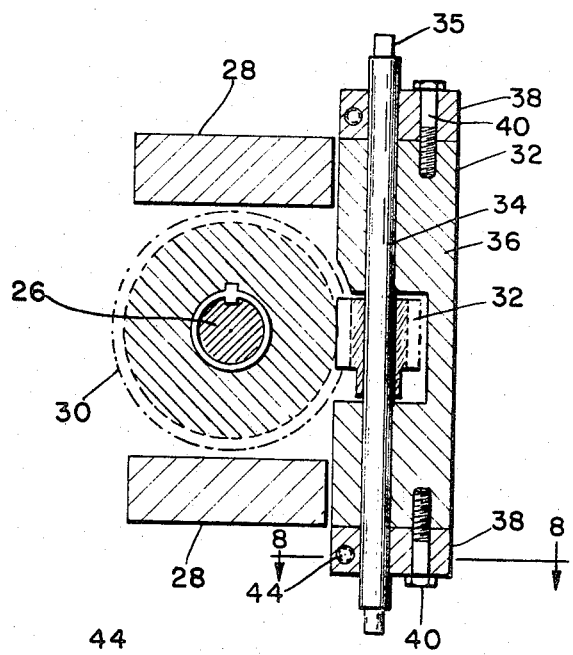
FIGURE 6 is a section taken along the line 6—6 of FIGURE 1.
Figure 8:
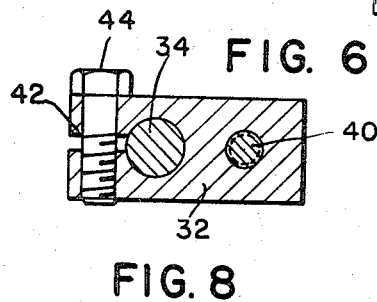
FIGURE 8 is a section taken along the line 8—8 of FIGURE 6.
Figure 7:
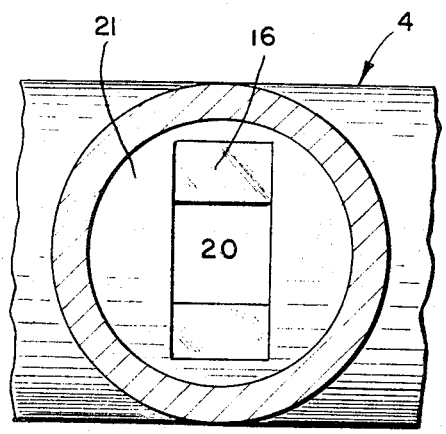
FIGURE 7 is a section taken along the line 7—7 of FIGURE 2.

The shaft 26 is slidably and rotatably mounted in a yoke or housing 28, bolted to the body 4 at the opposite end of outlet port or chamber 25. Yoke 28 accommodates a worm gear 30 secured to shaft 26 and operated by a worm 32 (FIG. 6) meshed tightly with the worm gear and secured to a worm shaft 34, the worm and worm shaft being mounted in and housed by a worm bracket 36 secured on yoke 28. The ends of worm shaft 34 are squared at 35 to permit rotation thereof by means of a wrench, etc., manually or automatically to adjust the rotational position of worm gear 30 and hence piston valve 8. A lock 38 is provided at each end of worm shaft 34 to lock the shaft in adjusted rotational position. Each lock is secured to the worm bracket by a thread bolt 40. One side of each lock is split at 42. By tightening bolt 44 the lock clamps the shaft 34 against rotation. By loosening bolt 44 the shaft 34 can be rotated to adjust the rotational position of the worm, worm gear and piston valve 8.

Figure 2:
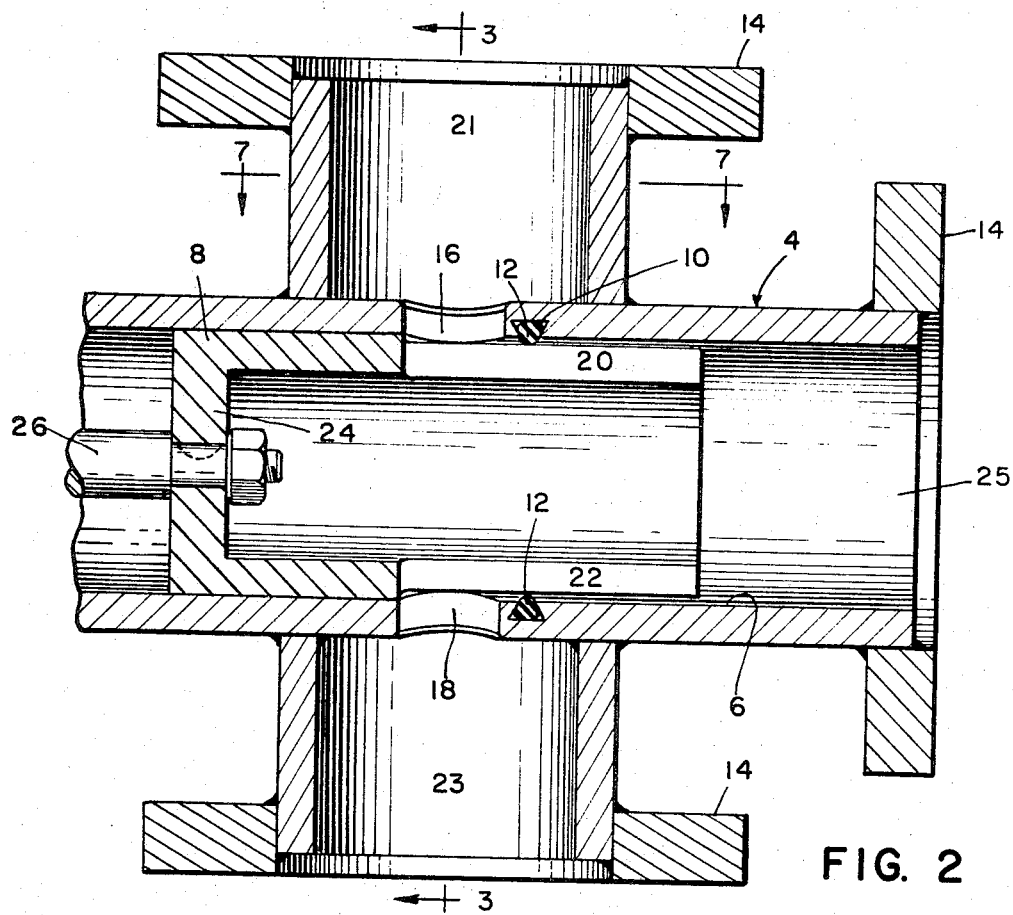
FIGURE 2 is a view like FIGURE 1 of a part of the mixing valve of FIGURE 1 with the valve moved to open position.

On the outer end of yoke 28 is mounted an operator 46 for adjusting the piston valve 8 longitudinally in the bore 6 between the position shown in FIGURE 1, in which the inlet ports 16 and 18 are closed by the piston valve 8 so that there is no flow from ports 16 and 18 to port 25, and the position shown in FIGURE 2 in which the slots 20 and 22 in the piston valve uncover the slots 16 and 18, respectively, to provide flow from ports 16 and 18 through slots 20 and 22 to port 25. Operator 46 may be of the diaphragm type, an air cylinder or an electrical operator. The operator shown in the drawing is of the diaphragm type. The end of the actuating shaft 48 of the operator 46, which is operated by movement of the diaphragm 56 in the operator in response to pressure changes introduced by pressure conduit 54, is secured to the end of shaft 26 by means of the coupling 50 of rectangular cross-sectional shape in which such ends of shafts 48 and 26 are secured so that longitudinal movement of the actuating shaft 48 by diaphragm 56 is transmitted to the shaft 26 and piston valve 8 but shaft 26 is free to be rotated with respect to shaft 48 a sufficient amount to permit rotational adjustment of shaft 26 without rotation of shaft 48. This can be done by threading the threaded stud 48a only part way into the end of shaft 26, as shown. The operator 46 is secured to yoke 28 by means of rods 52.

When piston valve 8 is in closed position as shown in FIGURE 1, the neoprene O-ring 12 forms a tight seal to prevent any flow from ports 16 and 18 to port 25.

The valve shown in the accompanying drawings is sized for mixing propane and air for use to peak shave or replace natural gas. However, the invention is not limited to the mixing of any particular gases. The propane is admitted through port 18 and the air through port 16. The desired proportions to be used in this case are usually from 45% propane and 55% air to 60% propane and 40% air. However, the invention is not limited to any particular proportion of the two gases.

Figure 3:
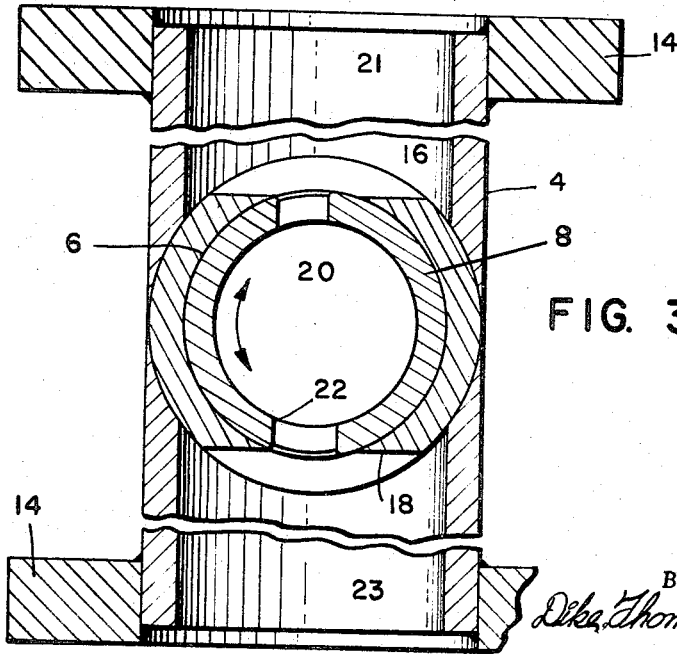
FIGURE 3 is a section taken along the line 3—3 of FIGURE 2 with the valve rotatably adjusted to a position in which the two gases are mixed in a predetermined ratio.
Figure 4:
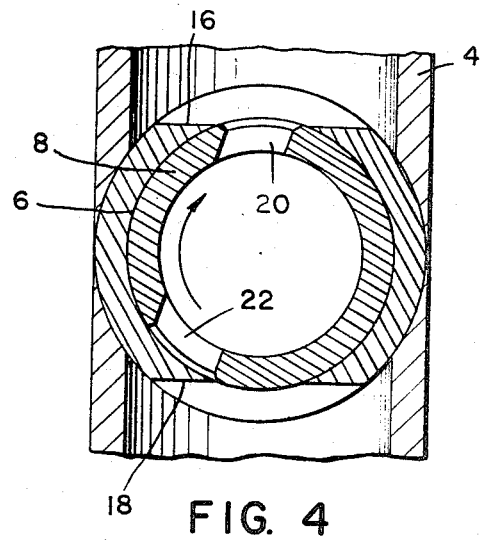
FIGURE 4 is a view like FIGURE 3 with the valve rotatably adjusted to provide flow of 100% of one gas and zero percent of the other.
Figure 5:
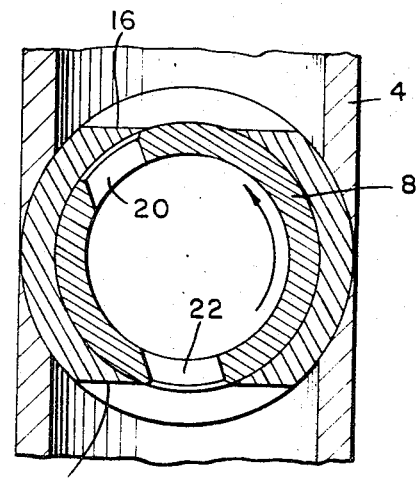
FIGURE 5 is a view like FIGURE 3 with the valve rotatably adjusted to provide flow of zero percent of the one gas and 100% of the other.

The circumferential widths of the slots 20 and 22 in the piston valve 8 and of the ports 16 and 18 in the body are sized to give proportions of from 0% propane and 100% air to 100% propane and 0% air in the following manner. The circumferential width of slot 22 in the piston valve 8 for admitting propane is larger than that of the slot 20 for admitting air. The propane vapor is heavier than air so the difference in size is required to offset the difference in weight or specific gravity of the two gases. In the rotational position of the piston valve 8 shown in FIG. 3 in which the entire width of each slot 20 and 22 is uncovered, the volumetric flow of each gas is approximately equal. By adjusting the rotational position of the piston valve 8 clockwise, the net effective flow area of port 18 will be decreased while the net effective flow area of port 16 remains constant. This clockwise adjustment can be continued until the flow of propane through slot 18 is completely cut off, as shown in FIG. 4, thereby giving 0% propane and 100% air. Further clockwise adjustment will reduce the total flow of air until there is no flow of either propane or air. By starting in the position shown in FIG. 3 and adjusting the rotational position of piston valve 8 counterclockwise, the net effective flow area of port 16 is reduced while the net effective flow area of port 18 remains constant. If the counterclockwise adjustment is continued, port 16 will become completely closed, thereby shutting off the flow of air. This will give 0% air and 100% propane. Continued clockwise adjustment will reduce the flow of propane until there is no flow of air or propane. In this way the ratio of the mixed gases can be controlled quite accurately and incrementally over a wide range.

This rotational control of gas proportioning is provided by the worm gear 30, worm 32, worm shaft 34 and the locks 38 as aforesaid. The worm to worm gear ratio in the drawings is 40 to 1 but the invention is not limited to any particular ratio. The tight meshing of the worm gear and worm ensures that no movement of the gear can take place except by turning the worm and any turning of the worm shaft will be transmitted to the worm and thus through the main control shaft 26 to the piston valve 8. This provides infinite micrometer adjustment of the proportioning of the gases.

Where the two gases have about the same specific gravity the circumferential widths of slots 20 and 22 may be the same. In such case, the slots are so positioned relative to the positions and sizes of ports 16 and 18 that (1) rotational adjustment of the piston valve in one direction will reduce the effective flow size of one of the slots 16 and 18 without affecting the effective flow size of the other until flow through the one port is shut off and (2) rotational adjustment of the piston valve in the other direction will reduce the effective flow size of the other slot without affecting the effective flow size of the one slot until flow through the other slot is shut off.

Also, the slots in the piston valve and body may be designed so that the effective flow sizes of the ports 16 and 18 are both varied at the same time, but at different rates, to achieve different proportions of the mixed gases by adjusting the rotational position of the piston valve. For example, one of the slots 16 and 18 may be reduced in size 3 times more than the other slot by the same rotational adjustment of the piston valve. Almost any desired schedule of adjustment of mixing can be achieved by varying the relative shapes, sizes and positions of the slots in the body and the slots in the piston valve. However, with the propane-air system described above it is preferred that rotational adjustment of the piston valve will vary the effective flow area of each port from full open down to zero flow without affecting the effective flow area of the other inlet port. This provides a wider and more flexible range of control and insures a constant B.t.u. output.

As aforesaid, the movement of the operator 46 is longitudinal to control the longitudinal position of the piston valve 8, such movement of the operator being controlled by a conventional pneumatic pressure control unit (not shown), e.g., a Foxboro model 43A pneumatic controller, connected at the outlet of the valve 2 beyond outlet port 25. As air pressure from the control unit is admitted to the diaphragm of the operator through inlet tube 54, the diaphragm moves away from the body 4 against the force of a spring (not shown) in the operator normally urging the piston valve to close position. This movement is transmitted to piston valve 8 through the stem 48, coupling 50 and shaft 26. This longitudinal movement of the piston valve causes its slots to uncover the slots or ports 16 and 18, allowing each gas to enter the bore 6 and be mixed in proportion to the rotational setting of the piston valve as described above. The diaphragm operator 46 will automatically position the piston valve 8 longitudinally to allow enough of the gases to enter the bore 6, mix, and pass out outlet port 25 to the system to be utilized to maintain a constant pressure in the system. Thus, the diaphragm operator 46 in response to pressure from the pressure control unit, controls the total flow through the valve in accordance with the amount required by the system, as sensed by the pressure control unit, by controlling the longitudinal position of the piston valve to uncover more or less of the ports 16 and 18. The operator 46 can position the piston valve longitudinally from "no flow" to "full flow," giving an excellent "turn down" ratio as high as 250 to 1. Means (not shown) is also provided to regulate the inlet pressures of the two gases. The spring loaded closed diaphragm operator 46 is of conventional construction.

Although an operator is preferred to automatically control total flow through the valve in accordance with the requirements or demand of the system, the longitudinal adjustment of the piston valve can be by hand.

Although the valve shown in the accompanying drawings, has rectangular ports 16 and 18 in the body and rectangular slots 20 and 22 in the piston valve, triangular, trapezoidal, trapezial, elliptical, parabolic or other shapes can be used to give different types of proportioning and control. Rectangular slots have the advantage of providing fine linear control of mixing.

Although this description and the accompanying drawings describe and show a valve in which only two gases are mixed and controlled, the same principles can be used to mix and control more gases if conditions dictate.

I claim:

1. A mixing valve for adjustably mixing different gaseous materials comprising a valve body having a bore, said valve body having at least two circumferentially spaced inlet ports inletting into said bore and an outlet port, a piston valve rotatably and slidably located in said bore, said piston valve having at least a pair of circumferentially spaced slots for controlling the relative rates of flow from each of said inlet ports to said outlet port through said piston valve in response to rotational adjustment of said piston valve in said bore and for controlling total flow through said mixing valve in response to longitudinal adjustment of said piston valve in said bore, said slots being located and sized relative to said inlet ports so that adjustment of the rotational position of said piston valve relative to said bore in one direction varies the effective flow area of one of said inlet ports relative to the other to change the proportion of each gaseous material in the mixed gases by changing the effective flow area of said one inlet port without affecting substantially the effective flow area of said other inlet port over at least a substantial part of the total range of said change in said effective flow area of said one inlet port from full open to zero flow area, and adjustment of the rotational position of said piston valve relative to said bore in the other direction varies the effective flow area of said other inlet port relative to said one inlet port to change the proportion of each gaseous material in the mixed gases, by changing the effective flow area of said other inlet port without affecting substantially the effective flow area of said one inlet port over at least a substantial part of the total range of said change in said effective flow area of said other inlet port from full open to zero flow area, whereby the relative rates of flow of said gaseous materials may be adjusted over a wide range, means for adjusting the rotational position of said piston valve to adjust said relative rates of flow and means for adjusting the longitudinal position of said piston valve to close said ports and to open said ports by varying amounts depending on the longitudinal position of said piston valve in said bore to thereby adjust the total flow of said gaseous materials from both said inlet ports to said outlet port.

2. A valve according to claim 1, said slots in said piston valve being responsive to said adjustment of rotational position of said valve in said one direction to reduce the effective flow area of said one inlet port from full open down to zero flow area without affecting substantially the effective flow area of said other inlet port and being responsive to said adjustment in rotational position of said piston valve in said other direction to reduce the effective flow area of said other inlet port from full open to zero flow area without substantially affecting the effective flow area of said one inlet port.

3. A valve according to claim 1, said inlet ports and said slots being rectangular in cross-sectional shape.

4. A valve according to claim 1, said two inlet ports comprising a pair of circumferentially spaced slots in said bore each communicating with an inlet chamber, said piston valve being hollow and open at one end to provide communication with said outlet port, the relative effective flow areas of said ports being varied in response to said rotational adjustment of said piston valve by varying the areas of circumferential alignment of said slots in said piston valve with said slots in said bore.

5. A valve according to claim 1, including a rotatable control shaft attached to said piston valve for adjusting the rotational and longitudinal position of said piston valve in said bore, said shaft being provided with a worm gear, a rotatable worm and worm shaft, the rotational position of which are adapted to be adjusted to adjust the rotational positions of said worm gear and said piston valve, and locking means to lock said worm in adjusted position.

6. A valve according to claim 5, said inlet ports and said slots in said piston valve being rectangular to provide linear control.

7. A valve according to claim 5, including a pressure sensitive diaphragm having an actuating shaft actuated thereby to adjust the longitudinal position of said control shaft in response to pressure at said outlet port to thereby automatically adjust the longitudinal position of said piston valve.

8. A valve according to claim 1, said valve body comprising a length of hollow pipe, the interior of which comprises said bore, said inlet ports comprising at least two circumferentially spaced slots in said length of pipe and extending through the pipe wall, said outlet port comprising an end portion of the interior of said pipe, said valve body also comprising at least two sections of pipe each located at an angle and radially disposed with respect to said length of pipe, one section being secured to the periphery of said length of pipe at one portion thereof over one of said slots therein and the other section being secured to the periphery of said length of pipe at another circumferentially spaced portion thereof over the other of said slots therein, said piston valve comprising a tubular member which is open at the end thereof located adjacent said outlet port and which has an end wall at the end thereof located distally from said outlet port.

9. A valve according to claim 8, said piston valve being slidable from a closed position, in which said slots in said piston valve are in axial nonregistry with said slots in said length of piping, to an open position, in which said slots in said piston valve are in axial registry with said slots in said length of piping.

10. A valve according to claim 8, an O-ring located axially between said slots in said length of piping and said outlet port, said O-ring forming a seal between the inner surface of said length of piping and the periphery of said piston valve when said piston valve is in closed position.

11. A valve according to claim 8, said slots in said piston valve being located in said bore axially beyond said slots in said length of piping toward said outlet port when said piston valve is in closed position.

12. A valve according to claim 8, said slots in said piston valve being in the edge therefor forming said open end thereof.

References Cited

UNITED STATES PATENTS

| | | | |
|---|---|---|---|
| 1,894,196 | 1/1933 | Reed et al. | 251—249.5 |
| 2,650,792 | 9/1953 | Marco | 251—249.5 |
| 2,961,005 | 11/1960 | Ipsen | 137—625.41 |
| 3,212,526 | 10/1965 | Williams et al. | 137—625.41 |
| 3,347,268 | 10/1967 | Muller et al. | 137—625.17 |
| 3,349,798 | 10/1967 | Allen | 139—625.19 |
| 2,556,780 | 6/1951 | Shryock | 137—625.17 |
| 3,202,181 | 8/1965 | West | 137—625.17 |

M. CARY NELSON, *Primary Examiner.*

W. R. CLINE, *Assistant Examiner.*

U.S. Cl. X.R.

251—61.2